April 18, 1967     H. MAHN     3,314,625
WINDING APPARATUS FOR DATA PROCESSING DEVICES
Filed Dec. 4, 1964

INVENTOR.
HERBERT MAHN
BY
AGENT

United States Patent Office 3,314,625
Patented Apr. 18, 1967

3,314,625
WINDING APPARATUS FOR DATA PROCESSING DEVICES
Herbert Mahn, Hamburg, Germany, assignor to North American Philips Company, Inc., New York, N.Y., a corporation of Delaware
Filed Dec. 4, 1964, Ser. No. 416,972
Claims priority, application Germany, Jan. 11, 1964, P 33,348
6 Claims. (Cl. 242—55.12)

This invention relates to winding apparatus for tapes containing information.

Mechanical punching or reading devices should satisfy the condition that the strip or tape (to be punched or read) is at rest with respect to the processing device, for example, punching dies or reading feelers etc. for as long as they act on the strip. This implies that either the processing head must move together with the strip, or the strip must be at rest during the period of engagement with a processing head. Heretofore inertia in connection with starting and stopping the takeup and processing device created a problem.

The present invention solves this problem in that the rotatable feed and take-up spools, together with the processing device are substantially at rest in coaxial side by side relation. Guide rollers, the axes of which adjust themselves in accordance with the running of the tape, lead the tape from the feed coil to the processing device and thence to the take-up spool. The said guide rollers and a counter or matrix surface which may be a roller which rolls on the cylindrical periphery of a processing device are secured to a supporting arm, likewise journalled coaxially of the spools and connected to a drive. The guide rollers circle, as planets, around the spools and processing cylinder.

The rotating masses are thus minimized since the feed and take-up spools and the processing device (punching, recording or reading head) having the largest masses are at rest or substantially at rest. By means of the guide rollers the tape is led from the feed spool to the processing cylinder and thence to the take-up spool. The loop or free length of tape between the take-up and feed spools is very short.

In order that the invention may be readily carried into effect, it will now be described, in detail, by way of example, with reference to the accompanying diagrammatic drawings, in which.

Figure 1:
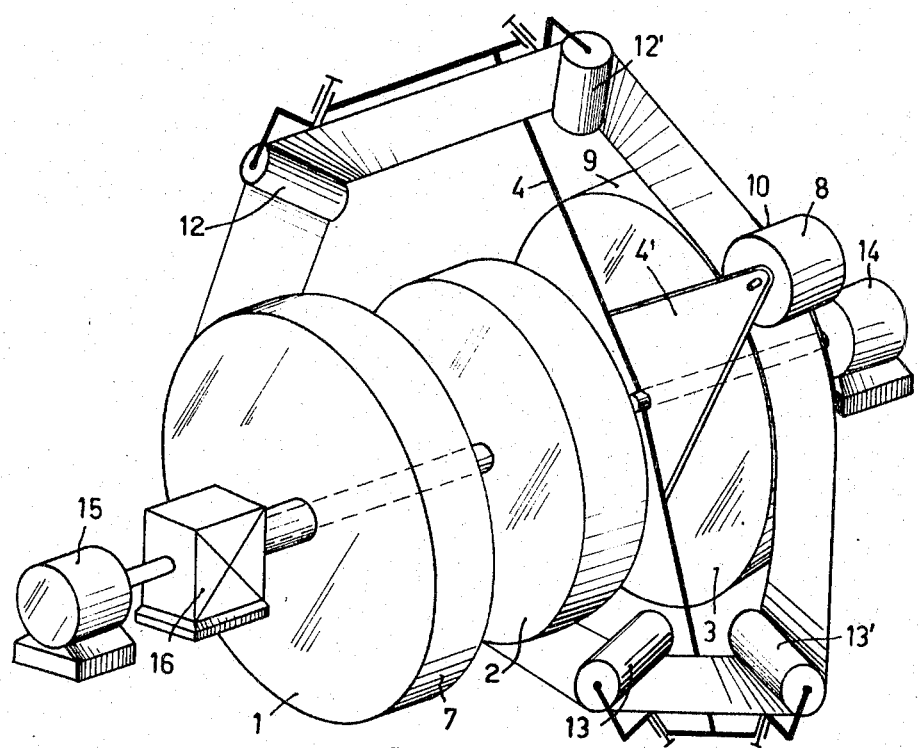
FIGURE 1 shows winding apparatus in which the spools do not rotate, according to the invention.
Figure 2:
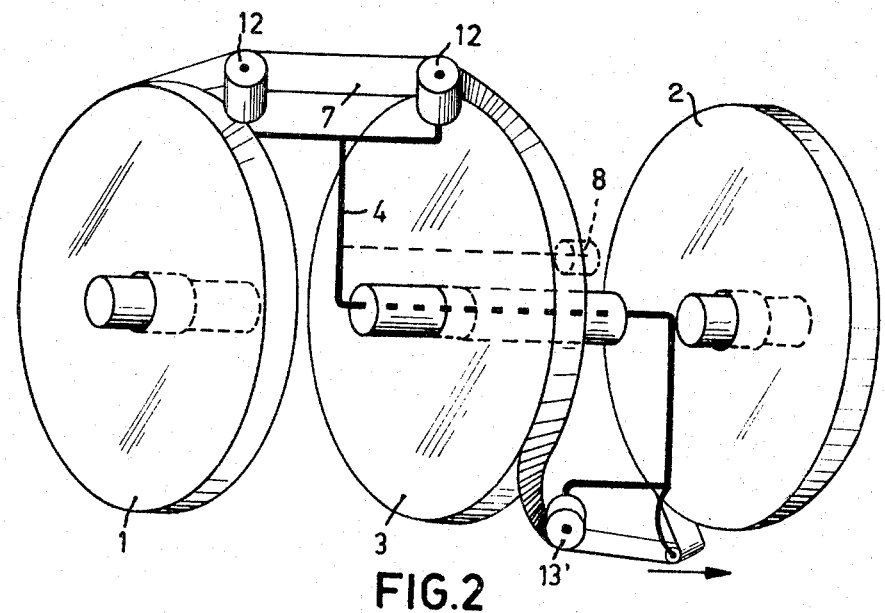
FIGURE 2 shows a variant of FIG. 1.

In the embodiment of FIGURE 1 the inertia of rotating masses are reduced to a minimum since feed and take-up spools 1, 2 and the processing disc 3, the parts having the largest masses, are kept at rest or substantially at rest. The feed spool 1, the processing disc 3 and the take-up spool 2 are arranged coaxially but the order of the said three parts on the common shaft is substantially arbitrary (FIGURE 2).

The mechanical structure shown comprises a cylindrical disc or housing 3, fixedly arranged, and in which a known processing device 9 is incorporated. A roller 8 which runs on the circumference of the cylindrical disc 3 is connected through an arm 4′ to a rotatable arm 4. The roller 8 serves as a matrix for punches or dies of the processing device 9 arranged inside the cylindrical housing 3. The device 9 is controlled in known manner and the surface 10 of the matrix roller 8 consists of elastic material which can be impressed by the processing punches or dies without causing damage. The feed spool 1 and the take-up spool 2 are arranged coaxially together with the disc 3. The strip 7 is led from the feed spool 1 onto the cylindrical disc 3 via a first pair of rollers 12, 12′ which are each rotatably connected to the coaxial, rotatable common arm 4. After being wound on part of the cylindrical disc 3, the strip is carried over onto the take-up spool 2 via a second pair of rollers 13, 13′. The cylindrical disc 3 is preferably covered with tape through an angle of 180° since for compensating masses and for obtaining a minimum moment of inertia it is advantageous to arrange the roller pairs 180° apart. Counter weights are thus unnecessary.

In the optimum case, that is to say, if the feed and take-up spools 1, 2 have exactly the same diameter as the cylindrical disc 3, both spools are at rest. With decreasing diameter of the feed spool and correspondingly increasing diameter of the take-up spool the two spools have to perform greater different rotational movements in opposite directions of rotation, in order to maintain the strip taut. This rotational movement is at its maximum when the two spools exhibit their largest difference in diameter with respect to the diameter of the cylindrical disc 3. The last-mentioned diameter must therefore correspond to the mean diameter of the feed and take-up spools.

When the feed and take-up spools 1, 2 are of unequal diameters they are driven by electric motors or the like (not shown) which operate against each other in compensating for the difference in diameter between the two spools and maintain the strip taut. As an alternative, the said difference in diameter may be compensated by only one motor if the connection with the second spool includes, in addition to the reversal in direction of rotation, a slip coupling. The roller system 12, 13, which is made as light weight as possible, may be driven in known manner (electric motor 14 and drive). The start-stop-operation of the roller system may be effected either by a magnetic coupling-brake combination or by a ratchet coupling corresponding to the divisions of the strip. For the feed and take-up spools 1, 2 there may be provided a known tensioning motor 15 and a differential drive 16 by which a uniform tension of the tape is obtained due to the torque of the tensioning motor 15 being divided over the two spools in opposite senses. The choice of arrangement of the spools and the cylindrical disc is determined, on the one hand, by the optimum possibility of changing the spools and threading the strip and, on the other hand, by control of the punching or reading device 9.

The transport of the strip in the described device is thus obtained by the rotating roller system without a change of mass and by the feed and take-up spools which rotate at a comparatively low speed with constantly changing mass.

As long as the strip is placed on the fixed disc 3 it has no relative movement with respect thereto. Fixation of the strip may be ensured by teeth on the cylindrical disc which meshes with transport perforation of the strip. The condition (no movement of the strip with respect to the die or reading head of the processing device 9) which is especially made in the case of mechanical punching and reading devices which act on the strip by means of dies of feelers 9 is thus satisfied.

The matrix against which the strip 7 is perforated by dies of the processing device 9 may be a steel cylinder with preferably radial holes, as well as an elastic matrix roller 8 into which the dies of the processing device 9 countersink for punching or perforate the strip 7 (FIGURE 1).

As an alternative, one of the rollers 12′ or 13′ may be used as such a matrix.

It is also possible to unwind the strip or tape 7 from the interior of the feed spool 1 that is to say from its core, and to wind it, after being placed on the processing device onto the exterior of the coil on the feed spool 1 in known manner. The object of the said device is to render impossible a difference between the rotational speeds of the spools and to render superfluous rewinding of the strip after processing.

The winding mechanism according to the invention may also be used in apparatus having magnetic tape. Recording and reading apparatus for magnetic tape are known in which magnetic heads are movable relative to the magnetic tape, preferably in a circular path, within a slit cylinder similar to disc 3.

What is claimed is:

1. Winding apparatus for a data processing device comprising a tape supply means having an axis of rotation, a tape take-up means in spaced parallel relation with said supply means, said take-up means having an axis of rotation, the axes of rotation of both said supply and take-up means being coaxial, a cylindrical tape processing means in spaced parallel relation with both said supply and take-up means, said processing means having an axis of rotation coaxial with said axes of rotation of said supply and take-up means, and tape transfer and winding means rotatable about an axis coincident with the axis of each of said supply, take-up and processing means for withdrawing tape from said supply means and winding said tape on said take-up means through a determined path which path engages the peripheral surface of said processing means substantially tangentially, said tape transfer and winding means orbiting a section of tape path about said processing means for moving the engaging portion of said path about the periphery of said processing means at substantially the speed of said tape in said path whereby relative movement between said tape and said processing means in a tangential plane is insignificant.

2. Winding apparatus according to claim 1 wherein said tape transfer and winding means includes a plurality of pulleys, one of said plurality of pulleys orbiting about said supply means, another of said plurality of pulleys orbiting about said take-up means, and still another of said plurality of pulleys orbiting about said processing means.

3. Winding apparatus according to claim 1 with the addition of means for maintaining the tape taut in said path.

4. Winding apparatus according to claim 1 wherein said processing means includes a matrix roller, said matrix roller being connected with said tape transfer and winding means.

5. Winding apparatus according to claim 1 wherein said tape supply means and take-up means comprise discrete coaxial supply and take-up spools.

6. Winding apparatus according to claim 5 with the addition of motor means connected with both said supply and taking-up spools for tensioning the tape in said path.

References Cited by the Examiner

UNITED STATES PATENTS 3,099,412   7/1963   Nystrom _____ 242—82 X

FOREIGN PATENTS 1,163,617   4/1958   France.
747,787   4/1956   Great Britain.

FRANK J. COHEN, Primary Examiner.

STANLEY N. GILREATH, W. S. BURDEN,
Assistant Examiners.